3,126,353
PRODUCTION OF AMIDE-LIKE POLYCONDENSATION PRODUCTS FROM HYDROXYNITRILES
Hans Lautenschlager, Ludwigshafen (Rhine), Germany, assignor to Badische Anilin- and Soda-Fabrik Aktiengesellschaft, Ludwigshafen (Rhine), Germany
No Drawing. Filed Nov. 30, 1959, Ser. No. 855,988
Claims priority, application Germany Nov. 28, 1958
5 Claims. (Cl. 260—2)

This invention relates to the production of amide-like polycondensation products from hydroxynitriles.

It is an object of the present invention to provide thermoplastic high molecular weight synthetic compounds. Another object of the invention is to provide precursors for the synthesis of aminocarboxylic acids.

These and further objects and advantages of the invention are achieved by polymerizing hydroxynitriles by heating them at 50° to 300° C. in the absence of water or solvents containing hydroxyl groups, amide-like polycondensation products being obtained.

By the process according to the present invention, aliphatic, cycloaliphatic or aromatic hydrocarbon compounds which contain a hydroxyl group and a nitrile group attached to a bivalent hydrocarbon radical can be converted into polymeric carboxylic acid amides. As hydroxynitriles, the following are especially suitable: alpha, omega-hydroxynitriles of aliphatic hydrocarbons with 2 to 6 carbon atoms, such as ethylene cyanhydrin, propylene cyanhydrin, delta-hydroxyvaleronitrile and epsilon-hydroxycapronitrile, as well as alpha, omega-hydroxynitriles having longer chains, such as epsilon-hydroxycaprylonitrile and omega-hydroxyundecyl cyanide. The cyanhydrins of aldehydes or ketones, such as acetaldehyde cyanhydrin, acetone cyanhydrin, normal-butyraldehyde cyanhydrin, benzaldehyde cyanhydrin or acetophenone cyanhydrin are also suitable. Other hydroxynitriles, such as 2-hydroxyhydrocinnamic acid nitrile or mandelic acid nitrile, may also be used for the production of the amide-like polycondensates. According to the present invention there may therefore be polymerized hydroxynitriles irrespective of whether the hydroxyl and the nitrile groups are attached to the same or different carbon atoms. Amide-like polycondensation products are obtained with regularly recurring CONH-grouping such as can be detected, inter alia, by infra-red analysis. The amide-like polycondensation products may be hydrolized to aminocarboxylic acids. There is thereby opened a new and simple way of passing from hydroxynitriles to aminocarboxylic acids. For example from ethylene cyanhydrin there is obtained a polycondensation product of beta-alanine and from this by hydrolysis, beta-alanine. From acetone cyanhydrin or epsilon-hydroxycapronitrile there can be prepared polycondensation products of alpha-aminoisobutyric acid or epsilon-aminocaproic acid, which may also be hydrolyzed to the corresponding aminocarboxylic acids.

The reaction can be carried out in closed vessels under the vapor pressure of the reaction mixture. It is more advantageous to work in a stirring or shaking autoclave in the presence of an inert gas i.e., a gas which does not react with the hydroxynitriles under the conditions employed at a pressure of more than 5 atmospheres. In the case of hydroxynitriles which tend to split off water it is more preferable to use pressures of 30 to 250 atmospheres. Nitrogen, argon, methane, carbon monoxide or also ethylene may be used as the inert gas. The reaction temperature is at least 50° C. and in general lies between 150° and 250° C. The reaction period is in general 30 minutes to 12 hours. The most favorable results are obtained at reaction periods between 1 and 3 hours.

The polymerization of the hydroxynitriles can be accelerated by the use of catalysts which are used in amounts of 0.01 to 10%, preferably 0.1 to 2%, with reference to the weight of the hydroxynitrile. Suitable catalysts are the alkali or alkaline earth metals, for example sodium, lithium, potassium or calcium, alkaline-reacting compounds of alkali or alkaline earth metals, for example sodium oxide, calcium hydroxide, sodium acetate or calcium carbonate, heavy metal halides, above all those which form complexes with hydroxynitriles, for example nickel bromide, cobalt iodide, iron chloride, titanium trichloride, titanium tetrachloride, vanadium trichloride, chromium trichloride, copper (I) chloride, copper (II) bromide or free halogens, especially iodine. The polymerization in the presence of catalysts may be carried out at relatively low temperatures between 50° and 100° C. and in general leads to polyamides with higher molecular weights than when working without catalysts.

In the polymerization of hydroxynitriles without the use of pressure it is preferable to use alkali metals or alkaline earth metals as catalysts. Thus for example ethylene cyanhydrin can be reacted in the presence of sodium at atmospheric pressure at 70° C. to give polycondensation products of the beta-alanine which however are less pure than when working under pressure in the presence of an inert gas.

The reaction may be carried out with the undiluted hydroxynitriles or also in the presence of a diluent which however should not contain any hydroxyl groups. Examples of suitable diluents are ethers, esters, ketones, hydrocarbons of halogenated hydrocarbons.

In the polymerization of the hydroxynitriles, amide-like polycondensation products of oily to pulverulent nature are obtained. Unreacted and low molecular weight constituents may be removed therefrom by extraction. Unreacted hydroxynitriles can be removed for example by extraction with ethers or hydrocarbons and low molecular weight polymers can best be extracted with methanol or ethanol. The reaction can be so conducted that up to 95% of the reaction product remains insoluble in methanol.

The insoluble residue in general melts between 180° and 350° C. and consists essentially of the polyamide-like reaction product. Detection of the CONH structure of the polymers is carried out by infra-red analysis and also by hydrolysis to the corresponding aminocarboxylic acids.

The following examples will further illustrate this invention but the invention is not restricted to these examples. The parts specified in the examples are parts by weight.

*Example 1*

80 parts of freshly distilled ethylene cyanhydrin are placed in a stainless steel pressure vessel. The air is expelled with nitrogen and a pressure of 100 atmospheres of nitrogen set up. The vessel is heated to 200° C. and shaken for 8 hours at 200° C. After cooling and releasing the pressure, a slightly colored solid mass is removed from the pressure vessel. Low molecular weight constituents can be removed therefrom by extraction with methanol. From 50 parts of reaction product there are obtained by extraction for eight hours with methanol, 26 parts of a substance insoluble in methanol and for the most part soluble in water which gives an infra-red spectrum typical of linear polyamides. It softens at 327° C.

The low molecular constituents obtainable by evaporation of the methanolic extract have a molecular weight of 260 and soften at 55° to 60° C. They also have a polyamide structure, as may be detected by infra-red analysis.

20 parts of the polymer of the softening point 327° C. are boiled with 100 parts by volume of 50% sulfuric acid for 4 hours under reflux, the solution is cooled, diluted with water and adjusted to pH 7 with hot barium hydroxide solution. The barium sulfate precipitate is filtered off and the aqueous filtrate evaporated under reduced pressure. 22 parts of beta-alanine are obtained in the form of pale yellow crystals, melting point 195° C. from aqueous methanol.

*Example 2*

80 parts of ethylene cyanhydrin are shaken with 1 part of sodium acetate at 175° C. under a pressure of 10 atmospheres of nitrogen for 12 hours. The reaction product is a pale yellow powder from which the low molecular weight constituents are dissolved out as described in Example 1. From 50 parts of the pale yellow reaction product there are obtained 36 parts of an amide-like polycondensation product which softens at 331° C. with discoloration.

*Example 3*

80 parts of ethylene cyanhydrin are shaken with 1 part of iodine for 3 hours under a pressure of 100 atmospheres of nitrogen at 200° C. 50 parts of the yellow powder thus formed are separated by extraction with methanol into 22 parts of a compound of the molecular weight 214 which melts at 45° to 50° C. and 28 parts of a polyamide which softens with decomposition at 270° C. From 20 parts of the polyamide, 21 parts of beta-alanine are obtained by hydrolysis.

*Example 4*

50 parts of ethylene cyanhydrin, 50 parts of tetrahydrofurane and 1 part of anhydrous nickel bromide are shaken at 175° C. and under a nitrogen pressure of 45 atmospheres for 6 hours. A powder suspended in tetrahydrofurane is obtained which can be filtered off and after drying yields 44 parts of a solid yellow substance. After extraction for eight hours with methanol, 18 parts of a polyamide which softens with discoloration at 335° C. are recovered. From this the same weight of beta-alanine is obtained by hydrolysis.

*Example 5*

100 parts of ethylene cyanhydrin are covered in a round flask of glass with 200 parts of dry toluene. 1 part of sodium is added thereto in small pieces and the mixture slowly heated to 70° C. while stirring. The bottom layer thereby becomes yellow in color. The temperature is raised rapidly to 100° C. and kept there for 3 hours. The bottom layer, which is now highly viscous, solidifies after standing for several hours. The toluene is removed from the solidified mass and 96 parts of a hard brittle polymer are obtained which melts at 95° to 100° C. After extracting 50 parts with methanol, 34 parts of an amide-like polycondensation product which melts at 112° C. and of which the molecular weight is 530, remain. The beta-alanine obtained therefrom by hydrolysis is, as is evident from the paper chromatogram, still contaminated by small amounts of two further amino acids which were not investigated in greater detail.

*Example 6*

1 part of anhydrous nickel bromide is dissolved in 80 parts of freshly distilled acetone cyanhydrin. The mixture is shaken for 8 hours at 200° C. under a nitrogen pressure of 30 atmospheres. The reaction product is a dark colored highly viscous mass. 69 parts of the same are insoluble in ether. This portion is hydrolyzed with 50% sulfuric acid and, after recrystallization from a mixture of acetone and water, yields alpha-amino-isobutyric acid (pale yellow crystals, sublimation point 275° to 280° C.).

*Example 7*

80 parts of delta-hydroxyvaleronitrile are shaken with 1 part of sodium for 8 hours at 165° C. and nitrogen pressure of 100 atmospheres. After cooling and releasing the pressure a dark colored mass is obtained. 50 parts thereof are extracted with benzene for 5 hours. There are obtained 31 parts of a polymeric product from which by hydrolysis there is obtained delta-aminovaleric acid (yellow crystals, melting point 151° to 152° C.).

If epsilon-hydroxycapronitrile is heated under 100 atmospheres nitrogen pressure as described above, there is obtained a dark colored mass of which 70% is insoluble. The solid residue after extraction with benzene gives by hydrolysis omega-aminocaproic acid of the melting point 201° C.

What I claim is:

1. A process for the production of amide-like polycondensation products which are insoluble in methanol and have melting points between 180° C. and 350° C. which comprises polycondensing a hydroxynitrile of the formula HO—R—CN, wherein R represents a saturated aliphatic hydrocarbon chain of from 2 to 11 carbon atoms, by heating said hydroxynitrile at temperatures between 50° C. and 300° C. and at pressures of from 30 to 250 atmospheres in the absence of water and of solvents containing hydroxy groups and in the presence of an inert gas.

2. A process as claimed in claim 1 wherein the hydroxynitrile is ethylene cyanhydrin.

3. A process as claimed in claim 1 wherein the hydroxynitrile is acetone cyanhydrin.

4. A process as claimed in claim 1 wherein the hydroxynitrile is delta-hydroxyvaleronitrile.

5. A process as claimed in claim 1 wherein the hydroxynitrile is epsilon-hydroxycapronitrile.

References Cited in the file of this patent

UNITED STATES PATENTS

| | | |
|---|---|---|
| 2,125,851 | Ralston | Aug. 2, 1938 |
| 2,331,671 | Ericks | Oct. 12, 1943 |
| 2,335,997 | Carlson | Dec. 7, 1943 |
| 2,376,334 | Babcock et al. | May 22, 1945 |
| 2,628,216 | Magat | Feb. 10, 1953 |
| 2,628,217 | Magat | Feb. 10, 1953 |
| 2,628,218 | Magat | Feb. 10, 1953 |